(12) United States Patent
Yutkowitz (10) Patent No.: US 7,684,759 B2
(45) Date of Patent: Mar. 23, 2010

(54) METHOD FOR DETERMINING THE DAMPED NATURAL FREQUENCIES OF A DYNAMIC SYSTEM

(75) Inventor: Stephen J. Yutkowitz, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 554 days.

(21) Appl. No.: 11/751,143

(22) Filed: May 21, 2007

(65) Prior Publication Data

US 2007/0270150 A1 Nov. 22, 2007

Related U.S. Application Data (60) Provisional application No. 60/801,930, filed on May 19, 2006.

(51) Int. Cl.
*H04B 17/00* (2006.01)
*G05D 13/00* (2006.01)

(52) U.S. Cl. .............. 455/67.11; 455/227; 455/23; 455/42; 455/205; 455/275; 700/304; 700/302; 700/13; 700/135

(58) Field of Classification Search ............... 455/67.11, 455/67.13, 227, 275, 23, 42, 526, 62, 703, 455/205
See application file for complete search history.

(56) References Cited

U.S. PATENT DOCUMENTS 6,347,255 B1 2/2002 Moser et al.

2005/0260968 A1* 11/2005 Ito et al. .............. 455/337
2007/0153930 A1* 7/2007 Reid ................ 375/260
2007/0270988 A1* 11/2007 Goldstein et al. .......... 700/94

FOREIGN PATENT DOCUMENTS

WO WO 2007/136828 A2 11/2007

OTHER PUBLICATIONS

Allen, et al., "A Global, single-input-multi-output (SIMO) implementation of the algorithm of mode isolation and application to analytical and experimental data".
Mechanical Systems and Signal Processing, vol. 20, No. 5, Jul. 2006, pp. 1090-1111, XP005312314.
Li, et al., "Vibration control of a PZT actuated suspension dual-stage servo system using a PZT sensor", IEEE Transactions on Magnetics, vol. 39, No. 2, Mar. 2003, pp. 932-937, XP001157952.
Allemang, et al., "A unified matrix polynomial approach to modal identification", Journal of Sound and Vibration, vol. 211, No. 3, 1998, pp. 301-322, XP002492858.
International Search Report dated Sep. 2, 2008 for Application No. PCT/US2007/0120164.

* cited by examiner

*Primary Examiner*—Huy Phan
(74) *Attorney, Agent, or Firm*—Jose de la Rosa (57) ABSTRACT

The present invention is a novel device, system, and method for determining the damped natural frequencies of a dynamic system whose characteristics are available in the form of a "frequency response function" FRF. According to an exemplary embodiment of the present invention, the method identifies the dampened natural frequencies associated with the poles and zeros of a transfer function. The method is especially useful for analysis of measurements that contain some degree of contamination due to noise or non-linear effects. It is based on a set of rules that may be more successful than a direct approach based on a least squares criteria.

20 Claims, 5 Drawing Sheets

METHOD FOR DETERMINING THE DAMPED NATURAL FREQUENCIES OF A DYNAMIC SYSTEM

CROSS-REFERENCE TO RELATED APPLICATIONS

This application claims priority to U.S. Patent Application No. 60/801,930 filed May 19, 2006 entitled "Method for Determining the Damped natural Frequencies of a Dynamic System", which is incorporated fully herein by reference.

TECHNICAL FIELD

The present invention relates to analyzing a frequency response function and more particularly, to a device, method, and system for analyzing a frequency response function for a dynamic system to determine the damped frequencies.

BACKGROUND INFORMATION

A frequency response function is one form of a description for the dynamics of a linear system. The dynamic relationship between two variables associated with such a system as an analytical expression is known as a transfer function. The transfer function is one way of representing the differential equations that describe a relationship between state variables or between a system input and a state variable. A linear system's transfer function can be represented as a ratio of polynomials in the complex Laplace variable s. In the field of modal analysis a technique for deriving a transfer function from an FRF is termed a "condensation algorithm." Many known condensation algorithms attempt to find the optimal set of coefficients for the s polynomial using criteria such as least squares. Attempts to use existing known techniques in situations where the number of available measurement locations is limited have yielded unsatisfactory results. When the goal of an analysis is to automate commissioning of controllers or to quickly determine a basic model for system dynamics, a method that develops a useful result from a small number of measurements may be desirable. In some applications the ability to identify a finite number of frequencies where the transfer function dynamics have lightly damped resonances and anti-resonances is more important than the ability to identify exactly the damping factors associated with these resonances/anti-resonances. Such is the case when automating the process of tuning control loops in motion control systems. In auto-tuning applications, identification of all the significant lightly damped resonant frequencies is a requirement. The term significant indicates a resonance that has some impact on the stability or performance of a closed loop system. It is also anticipated that a multiple step approach where the real and imaginary components of each pole are identified in separate steps may lead to an overall better result. In this case heuristic rules for identifying the damped natural frequencies of poles and zeros correspond to determination of the imaginary components of the roots. Next a general constrained optimization can be performed to identify the real components by minimizing the least squared error between the original FRF and one derived for the selection of real components.

There exist a number of methods for identifying the dynamics of an oscillatory mechanical system by analyzing an FRF. Among publications that document these methods are those by Drs. Randy Allemang and David Brown. These methods either operate directly on the frequency domain FRF or operate on the impulse response time domain function obtained by applying the inverse Fourier transform to the FRF. These methods use least squares criteria to fit a large number of measurements from various measurement points on the mechanical system to determine the system eigenvalues. In a second step the residues are determined from which the transfer function matrix is derived. The same methods applied to a limited number of input-output locations have failed to provide the needed results.

In U.S. Pat. No. 6,347,255 to Moser, Moser describes a technique for identifying "poles" and "zeroes" from an FRF measurement. Moser's approach is heuristic and is designed specifically for the case of servo tuning. Software that implements Moser's approach occasionally fails to identify a pole or zero whose presence affects the tuning of the servo controller.

The current invention may also uses a heuristic approach but provides additional action and aspects to Moser's approach by imposing more restrictions on the conditions for identifying a pole/zero to gain improved immunity to noise. The result may provide a more robust method that can detect more actual poles while being less susceptible to false results, i.e. identification of a pole that is not a system pole but rather a consequence of noise in the measurement or a manifestation of non-linear effect in the system.

Accordingly, a need exists for a device, method, and system for quickly and efficiently determining the damped frequencies of a dynamic system. There may be an additional need to prevent misidentifying or identifying incorrect damped frequencies.

SUMMARY

The present invention is a novel device, system, and method for determining the damped natural frequencies of a dynamic system. According to an exemplary embodiment of the present invention, the method may produce a frequency response function for the dynamic system and smooth the frequency response function. The method identifies a set of possible candidate frequency values by determining when a derivative of the frequency response amplitude function changes sign, that is the amplitude derivative function traverses zero. The frequencies are sorted into two lists: a list of "poles" where the derivative function traverses zero with negative slope, and "zeroes" where the derivative function traverses zero with positive slope. The method may sort the set of possible candidate frequency values from highest to lowest amplitude, in the case of "poles" and lowest to highest amplitude in the case of "zeroes". The method may eliminate the least suitable candidates for poles and zeroes using similar and analogous techniques. For the sake of clarity this description describes the case for poles, while completely analogous approaches may be used for elimination of least suitable candidates for zeroes. The method may identify the next candidate in the sorted candidate frequency values starting from the beginning of the set that has not been eliminated. The method determines a range of influence by identifying a lower root frequency and higher root frequency. The method eliminates the candidate frequency value by comparing the candidate frequency value with a maximum amplitude in the range of influence and if the candidate frequency value is eliminated returns to the action of verifying the next candidate. The method may check for a direction of a change of phase in the range of influence that corresponds to the expected behavior for a pole or zero: typically positive change in phase for zeros and negative change in phase for poles. When direction is opposite that expected, the method may eliminate the candidate frequency value and the return to the action of verifying the next candidate.

The method may determine which frequency candidate values of lesser significance are in the range of influence by identifying frequency candidate values occurring later in the list of frequency candidate values. When the frequency candidate value occur in the range of influence of the currently considered candidate, the method may eliminate the later candidate frequency value and then return to the action of identifying the next candidate. The method may determine if there exist frequency candidate values that are of greater significance within the range of influence of the currently considered pole/zero by identifying frequency candidate values occurring earlier in the list of frequency candidate values. When an earlier value is not designated as having been eliminated and is within the range of influence of the currently considered candidate, the method may eliminate the currently considered candidate frequency value and return to the action of identifying the next candidate. The method may determine if the frequency is in the range of influence of the frequency response function prior to the action of smoothing. The method may then eliminate the frequency candidate value by comparing a noise level in the frequency response function to the amplitude in the region of a candidate pole and when the candidate frequency value is eliminated returning to the action of identify the next candidate. The method returns to the action of identifying the next candidate until all frequency candidate values have been identified.

It is important to note that the present invention is not intended to be limited to a system or method which must satisfy one or more of any stated objects or features of the invention. It is also important to note that the present invention is not limited to the exemplary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings herein.

DETAILED DESCRIPTION

The present invention is a novel device, system, and method for determining the damped natural frequencies of a dynamic system whose characteristics are available in the form of a "frequency response function" FRF. According to an exemplary embodiment of the present invention, the method identifies the dampened natural frequencies associated with the poles and zeros of a transfer function. The method is especially useful for analysis of measurements that contain some degree of contamination due to noise or nonlinear effects. It is based on a set of rules that may be more successful than a direct approach based on a least squares criteria.

Pre Conditions

The algorithm for identifying the damped natural frequencies associated with the poles and zeroes of an oscillatory mechanical system is based on some observations about mechanical systems. For the case of a system that relates a force or torque input to a position or speed output, the following rules may apply.

The sequence of the appearance of poles and zeros with increasing frequency is not fixed and depends on the specific characteristics of the dynamics system: e.g. a sequence of z-p-z-p is possible, but so is a sequence z-p-p-z etc.

The amplitude of the FRF at a damped natural frequency reaches an extreme value.

The amplitude experiences a local maximum at the damped natural frequency of a pole.

The amplitude experience local minimum at the damped natural frequency of a zero.

The phase of the FRF decreases in the neighborhood of a pole.

The phase of the FRF increases in the neighborhood of a zero (for most systems).

Measurements often contain "noise" that can be falsely deemed a pole or zero.

Noise effects are reduced by smoothing the FRF—smoothing is some type of averaging of the value at a given frequency with values at neighboring frequencies.

Too much smoothing distorts the shape of the FRF.

Smoothing amplitude and phase results in a different sort of distortion than the type of distortion accompanying smoothing of the complex values.

frequency, and to indicate whether or not it is eliminated as a candidate.

Determination of Damped Natural Frequency

The algorithm for identifying damped natural frequencies of poles and zeroes may use nearly identical rules for finding zeros and poles. A single algorithm that handles both types of roots may be implemented where a change in parameterization configures the algorithm to the specific task of either zero or pole finding.

Figure 4A:
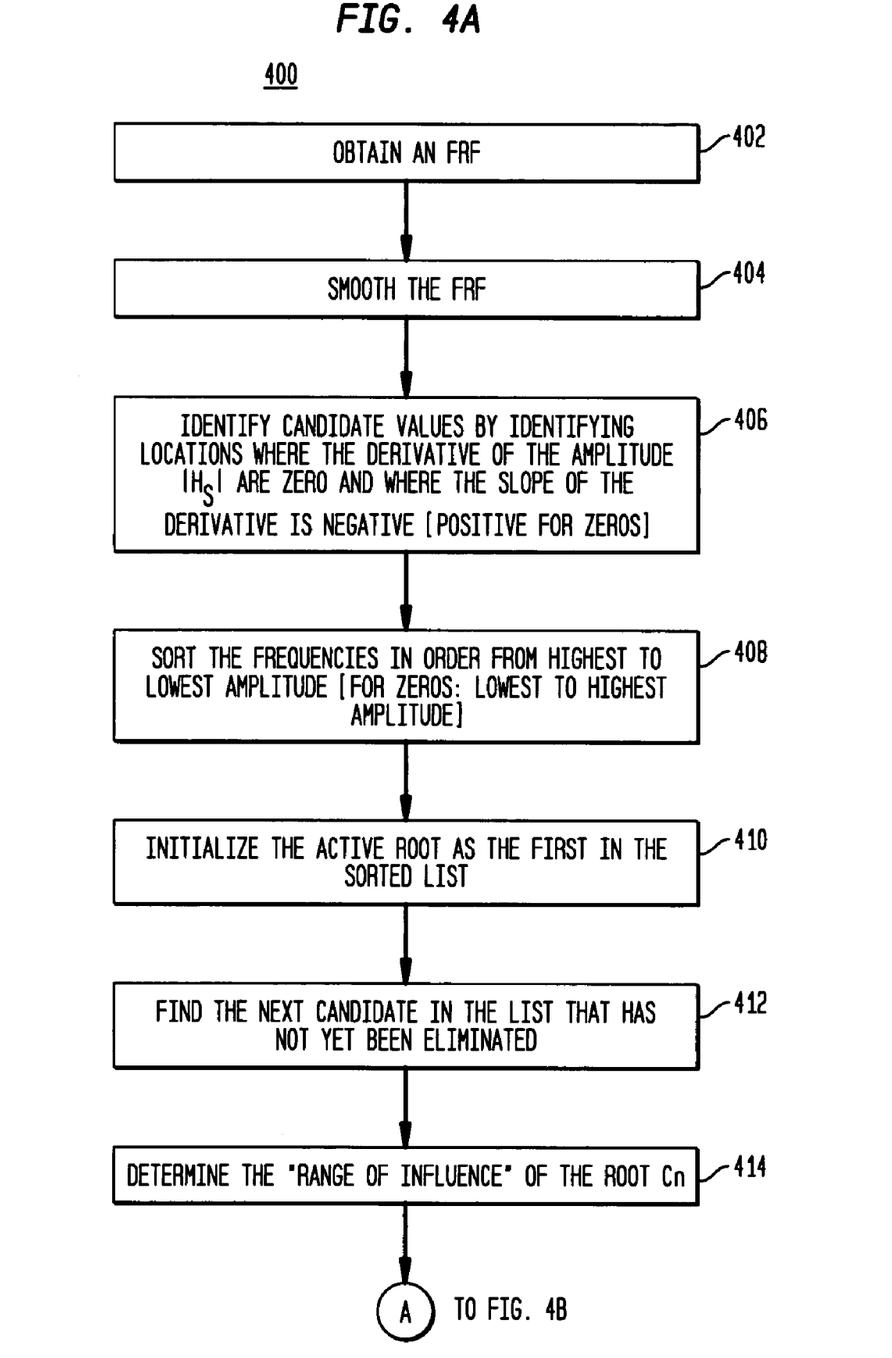
FIGS. 4A and 4B are a flowchart of a method for determining the damped natural frequencies of a dynamic system according to an exemplary embodiment of the present invention.
Figure 4B:
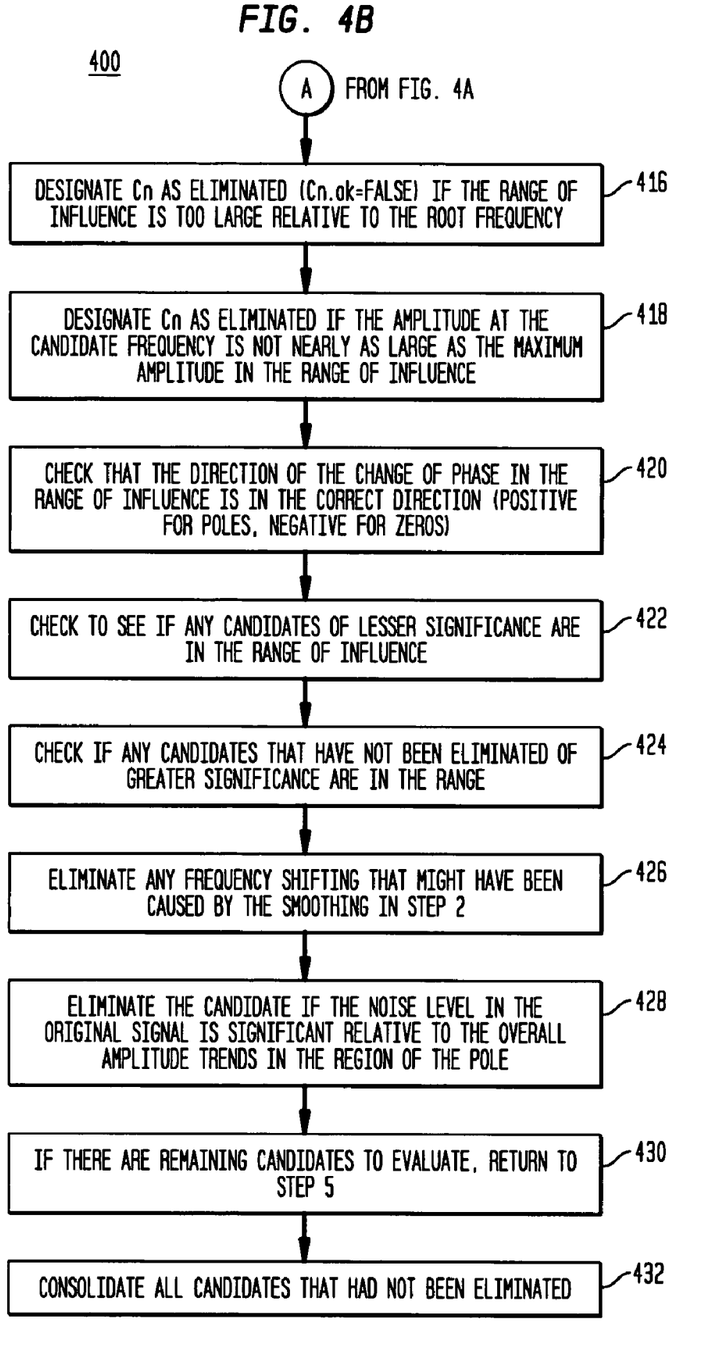

A summary of the algorithm 400 follows. The summary will pertain to poles; modifications to account for zeros are indicated in square brackets. The basic idea of the algorithm is to identify a list of candidate poles/zeroes and then eliminate candidates from the list by imposing a series of stricter and stricter criteria. The candidates may be represented as arrays of objects where each object has member data to indicate the frequency, and to indicate whether or not it is eliminated as a candidate.

1. Obtain an FRF H (block 402).

2. Smooth H moderately to obtain $H_s$(block 404). This is done to remove fluctuations and noise from the FRF, while maintaining the overall shape. In one method, the smoothing uses an averaging window whose width increases linearly with frequency. In this embodiment smoothing is performed by transforming the complex valued FRF to polar coordinates, smoothing amplitude and phase separately and re-combining to form a complex value. In some cases the smoothing operation may also be used to smooth the complex values Smoothing is implemented as a method of a software class for representing a FRF. Various types of smoothing are made available to address a number of different requirements. In general smoothing consists of performing a windowed average over a range of frequencies to determine the smoothed value at the center frequency. The width of the smoothing Window in terms of frequency range may be fixed or may vary as a function of frequency. Linear and log-wise functions of window width as a function of frequency are some examples of how the window width may be varied. Such variable width windows are especially useful with an FRF, because the typical width of a resonance or anti resonance generally increases with frequency. This means that too much smoothing at a low frequency will completely distort the shape of the resonance and anti-resonances at the low frequencies. Similarly more smoothing is required at high frequencies to effectively eliminate the fluctuations that can occur due to imperfections in the measurement, Additional flexibility in smoothing allows the user to specify the shape of the smoothing window W as a function of the local frequency f measured from the window start frequency, e.g. flat: $W(f)$ =const, triangular $W(f)=const+a*f$ (fmin<f<fctr), $W(f)=const+a*f$ (ctr)−a*(f−fmin) (fctr<f<fmax), or exponential: $W(f)$ const+a exp(−(fctr−f)|*b). Additionally, the smoothing may be applied to the complex valued FRF, or may be applied to the amplitude and phase functions separately and then recombined to form a complex number.

3. Identify candidate values by identifying locations where the derivative of the amplitude $|H_s|$ are zero and where the slope of the derivative is negative [positive for zeros], Use linear interpolation for cases where the derivative of the sequence traverses zero (block 406). A method of the FRF class is especially useful for locating frequencies where some aspect of the FRF (real, imaginary, amplitude, phase, dB-amplitude) traverses a certain value.

4. Sort the frequencies in order from highest to lowest amplitude [for zeros: lowest to highest amplitude] and store sorted result in an array of candidate objects C. C.ω=root frequency, C.ok=logical variable to indicate whether candidate has been eliminated: C.ok initializes to TRUE (block 408).

5. Initialize the active root as the first in the sorted list Cn=C[0] (block 410).

6. Find the next candidate in the list that has not yet been eliminated (block 412).

7. Determine the "range of influence" of the root Cn. The range of influence is represented as a pair of frequencies: one lower than the root frequency: $\omega_{left}$ and one higher than the root frequency: $\omega_{right}$, that approximate the neighborhood of the root. The lower frequency $\omega_{left}$ is determined by finding the highest frequency below Cn.ω where $\|H_s(\omega)\|$ passes through a factor k times the amplitude at the candidate frequency $k*\|Hs(Cn.\omega)\|$ with a positive slope [negative slope for zeros]. The upper frequency $\omega_{right}$ is determined by finding the lowest frequency above Cn.ω where $\|H_s(\omega)\|$ passes through $k*\|H_s(Cn.\omega)\|$ with a negative slope [positive slope for zeros]. Fore poles, the factor k is a number between 0 and 1, the value 0.7 has proven to work well (block 414). For zeroes, the factor k is a number greater than 1, the value 1.4 has proven to work well.

8. Designate Cn as eliminated (Cn.ok=FALSE) if the range of influence is too large relative to the root frequency. This accounts for cases where the candidate had been caused by a very small deviation along a more general trend (upward or downward) where the size of the deviation after filtering is less than the factor employed in the previous step (e.g. 0.7 times peak value causes the algorithm to find a location on the larger trend) (block 416). While such cases may indicate an actual pole/zero, they are eliminated as their amplitude effect is insignificant relative to the larger trend.

9. Designate Cn as eliminated if the amplitude at the candidate frequency is not nearly as large as the maximum amplitude in the range of influence. This would mean that the candidate is not significant relative to noise. If the candidate Cn is eliminated at this step, then return to Step 6, otherwise continue to step 10 (block 418).

10. Check that the direction of the change of phase in the range of influence is in the correct direction (positive for poles, negative for zeros). The net change in phase is determined by fitting a straight line and intercept to the phase in the region of influence. This is done using a linear least squares solution using well known techniques. Prior to fitting a line to the phase response it must undergo an "unwrap" operation to avoid step discontinuities for cases where the phase traverse 180 degrees. Unwrapping consists of locating instantaneous phase changes that suggest a traversal through 180 degrees. The general phase trend is the slope of the straight line. If the slope is in the wrong direction (has the incorrect sign), then the candidate is eliminated and the processing returns to Step 6 (block 420).

11. Check to see if any candidates of lesser significance are in the range of influence. Eliminate less significant poles [zeros] whose frequency is in the range of influence of Cn. A less significant pole [zero] is identified as one that occurs later in the list of candidates. This means a candidate whose amplitude is lower [higher] than the amplitude of Cn (block 422).

12. Check if any candidates that have not been eliminated of greater significance are in the range (block 424). This is accomplished by searching the list of candidates from the beginning of the list to the candidate nearest Cn and testing if any of these are in the range of Cn. If a candidate of greater significance is found, then eliminate Cn and return to Step 6. Such a situation can occur even though Step 11 will have been performed on all previous candidates. This is the case when the range of influence of the lower amplitude candidate is wider than the range of influence of the higher amplitude candidate.

13. Eliminate any frequency shifting that might have been caused by the smoothing in step 2 (block 426). The original un-smoothed FRF is examined to find the frequency in the range of influence where the amplitude of the original FRF H experiences a maximum [minimum]. Change the frequency of Cn.ω to be this new frequency and re-formulate the range of influence by shifting the range to be centered on the adjusted frequency while maintaining its width.

Figure 1:
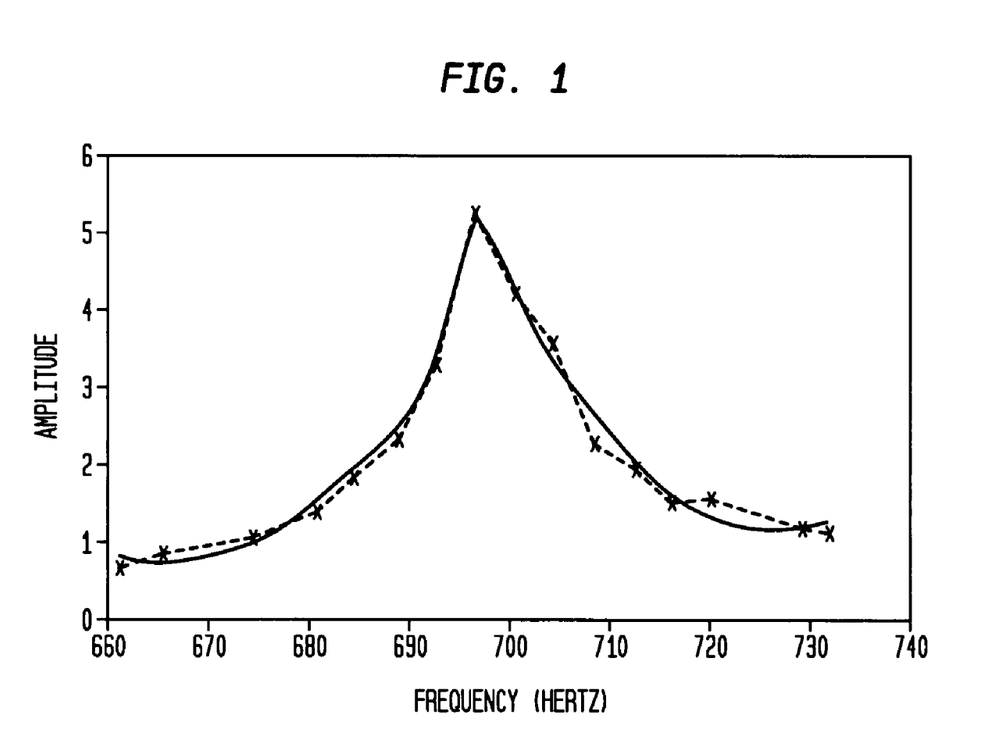
FIG. 1 is a diagram of an exemplary candidate pole that passes the parabola fit test according to an embodiment of the invention.
Figure 2:
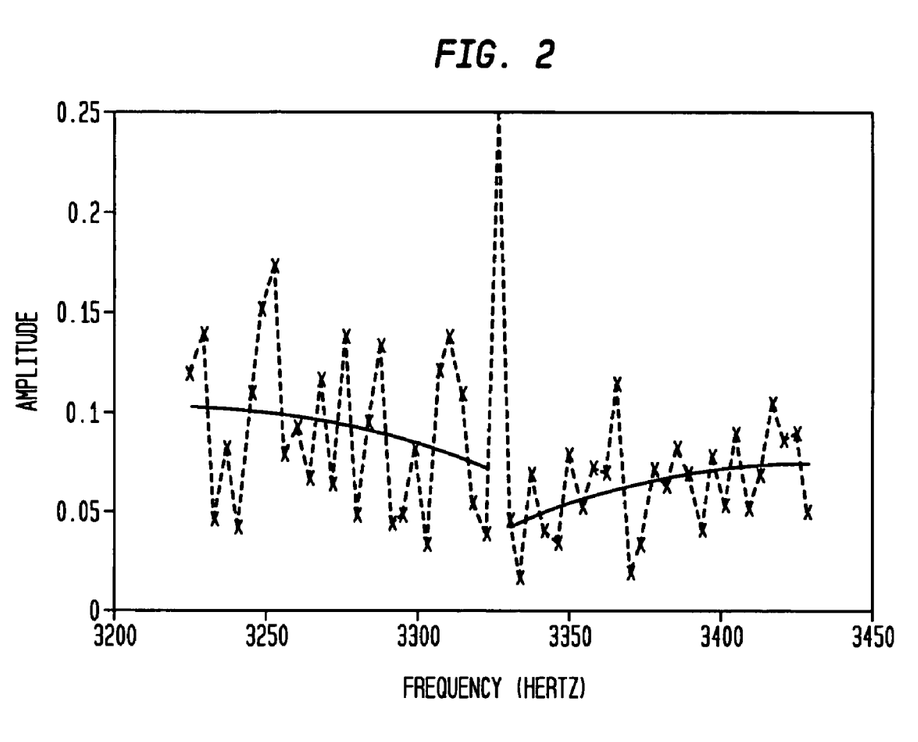
FIG. 2 is a diagram of an exemplary candidate zero that fails the parabola fit test according to an embodiment of the invention.
Figure 3:
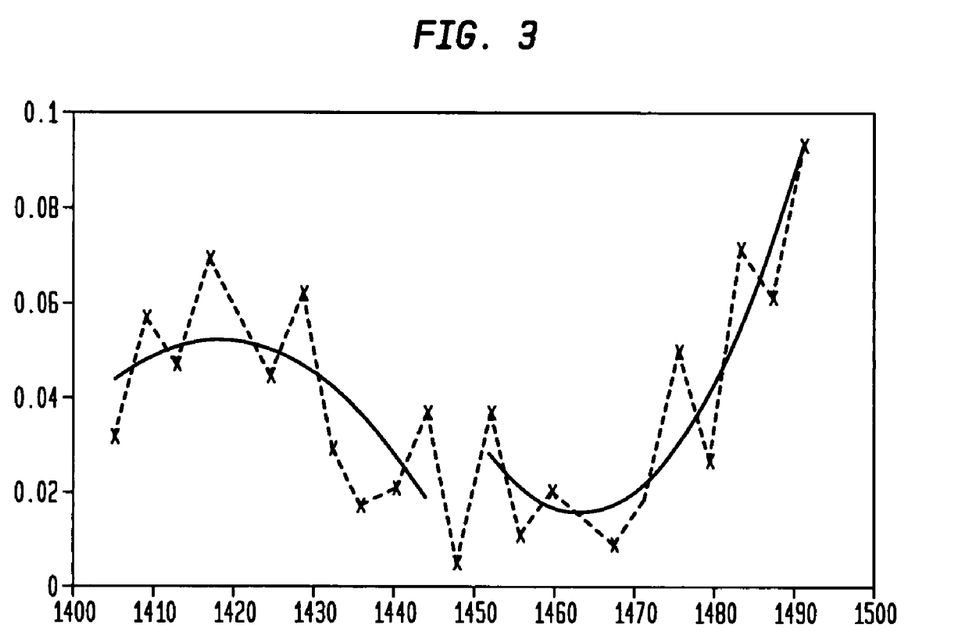
FIG. 3 is a diagram of an exemplary zero that passes the parabola fit test according to an embodiment of the invention.

14. Eliminate the candidate if the noise level in the original signal is significant relative to the overall amplitude trends in the region of the pole (block 428). This is accomplished by fitting two parabolas to the amplitude response. The parabolas are formulated as a function of distance from the window start frequency with three parameters: $A(\Delta f)=c_0+c_1*\Delta f+c_2*\Delta f^2$. The first parabola spans the frequency range from the range of influence lower limit to the frequency just below that of Cn.ω. The second parabola spans the frequency range from the frequency just above that of Cn.ω to the range of influence upper limit. Thus the frequency of the pole/zero is not included in the parabola fit. The parabola is intended to identify whether there is a trend at adjacent frequencies leading to the pole/zero. If the standard deviation of the original signal ||H|| measured over the frequency range of influence is greater than twice the standard deviation of the two parabolas, it may be interpreted to mean that the amplitude of the candidate root is similarly significant relative to the noise and candidate Cn is eliminated. If the orientation of the parabolas does not represent a pole [zero] then the candidate is eliminated. The orientation of the parabolas requires that the value of each the parabola at the location adjacent to the root frequency be the greater [less] than the value of each parabola at the location farthest from the root frequency. An example of a candidate pole that passes the parabola test is shown in FIG. 1. An example of a candidate zero that fails the parabola test is shown in FIG. 2. An example of a zero that passes the parabola fit test is shown in FIG. 3.

15. If there are remaining candidates to evaluate, return to step 6, otherwise continue to step 16 (block 430).

16. Consolidate all candidates that had not been eliminated. These are the poles. Repeat steps 3 through 15 for the zeros (block 432).

Determination of Real Components of Roots

In some applications, such as automated servo tuning of speed and position controllers, identification of the damped natural frequency of poles and zeros is sufficient information to proceed. In other cases, where the goal may be system identification, the determination of the damped natural frequency may just be the first step. A second step is required for determination of the real component of each pole/zero. The real component of every root can be determined using a numerical solution to a constrained nonlinear optimization problem. In that case the independent variables are the real components of each of the poles identified, and the cost function is the sum of the error squared between the complex value of the FRF and the complex value of the synthesized FRF for the candidate point in the parameter space. The error squared is evaluated at each frequency of a two sided FRF to enforce the additional constraint that an FRF of a physical system will have a response over negative frequencies which is the complex conjugate of the response at the corresponding positive frequency with the same absolute value, It may be advantageous to impose a weighting function that decreases with frequency to avoid under-emphasizing low frequency resonances that span only a few frequency lines in the discrete FRF. A weighting function that is constant over the lowest frequency range and then decreases as an inverse function of frequency has a similar effect of having generated an FRF whose density is constant when the frequency is plotted on a log scale. The amplitude of a first order low pass filter is a good approximation of such a function.

The constrained optimization problem is formulated by constructing a transfer function for a given combination of real components of roots. The transfer function is augmented by an additional real pole and an additional real zero to account for general trends in the FRF that do not appear as salient resonances or anti-resonances in the FRF measurement. The number of augmentation poles and zeros can be extended to include multiple real poles/zeros and multiple complex-conjugate poles and zeroes. In the following formulation for the candidate transfer function the known values are the $\omega_p(i)$, $\omega_z(i)$, nZeros, nPoles, and the unknowns are K, $\sigma_p(i)$, $\sigma_z(i)$, $\sigma_{pa}$, and $\sigma_{za}$. A constraint that all $\sigma_p$ be less than zero is applied to ensure a stable result. An additional constraint that all oz be less than zero may optionally be applied to ensure a "minimum phase" result.

$$\hat{H}(s) = K \frac{\prod_{\omega}^{nZeros} ((s + j\omega_z(i) - \sigma_z(i)) * (s - j\omega_z(i) - \sigma_z(i)))}{\prod_{k=1}^{nPoles} ((s + j\omega_p(k) - \sigma_p(k)) * (s - j\omega_p(k) - \sigma_p(k)))} * \frac{(s - \sigma_{za})}{(s - \sigma_{Pa})}$$

The cost function for the constrained optimization is the sum of the weighted errors squared between the transfer function estimate and the FRF measurement where the transfer function estimate is evaluated at s=jw for each frequency in the two-sided FRF measurement. In cases where the measured FRF is one sided, it is a simple matter to make it two sided by concatenating the original FRF to the end of the original FRF conjugated and order-reversed. The cost function is shown below.

$$V(\overline{\sigma_p}, \overline{\sigma_z}) = \Sigma[W(w_i) * (\|H(\tilde{\omega}_i) - \hat{H}(j\tilde{\omega}_i)\|^2 + \|(H(\tilde{\omega}_i))^* - \hat{H}(-j\tilde{\omega}_i)\|^2)]$$

As mentioned one way to formulate the weighting function is as the absolute Value of a first order low pass filter. The cutoff frequency for the filter determines at what frequency de-emphasizing the high frequency data (to emulate log-frequency spacing) should begin. For a uniformly spaced FRF, a reasonable value for the filter's cutoff frequency $\omega_0$ can by 100 times the frequency spacing.

$$W(\omega) = \left\| \frac{\omega_0}{j\omega + \omega_0} \right\|$$

The present invention is not intended to be limited to a system, device, or method which must satisfy one or more of any stated or implied object or feature of the invention and is not limited to the exemplary embodiments described herein. Modifications and substitutions by one of ordinary skill in the art are considered to be within the scope of the present invention.

The invention claimed is:

1. A method for determining the damped natural frequencies of a dynamic system comprising the actions of:
   producing a frequency response function for the dynamic system;
   smoothing the frequency response function;
   identifying a set of possible candidate frequency values by determining when a derivative of the frequency response function traverses through zero;
   sorting the set of possible candidate frequency values based on amplitude;
   identify the next candidate in the sorted candidate frequency values starting from the beginning of the set that has not been eliminated;
   determining a range of influence by identifying a lower root frequency and higher root frequency;
   eliminating the candidate frequency value by comparing the candidate frequency value with a maximum or minimum amplitude in the range of influence and when the candidate frequency value is eliminated returning to the action of identify the next candidate;
   checking a direction of a change of phase in the range of influence occurs in an expected direction, and when direction is opposite the expected direction, eliminating the candidate frequency value and the returning to the action of identify the next candidate;

determining if any frequency candidate values of lesser significance are in the range of influence by identifying frequency candidate values occurring later in the frequency candidate values set and when the frequency candidate value occurs later eliminating said later candidate frequency value and the returning to the action of verifying the current candidate;

determining if any frequency candidate values of greater significance are in the range of influence by identifying frequency candidate values occurring earlier in the set frequency candidate values and when the earlier frequency candidate value has not been eliminated and appears in the range of influence of the currently considered candidate, eliminate the currently considered candidate frequency and the returning to the action of verifying the next candidate;

eliminating the frequency candidate value by comparing a noise level in the frequency response function to the amplitude in the region of a pole and when the candidate frequency value is eliminated returning to the action of identify the next candidate; and returning to the action of identifying the next candidate until all frequency candidate values have been identified.

2. The method of claim 1, wherein the action of determining a range of influence of a pole involves determining the lower root frequency by finding the highest frequency passing through a factor k ($0<k<1$) times the amplitude at the candidate frequency with a positive slope.

3. The method of claim 1, wherein the action of determining a range of influence of a zero involves determining the lower root frequency by finding the highest frequency passing through a factor k ($k>1$) times the amplitude at the candidate frequency with a negative slope.

4. The method of claim 1, wherein the action of determining a range of influence of a pole involves determining the higher root frequency by finding the lowest frequency passing through a factor k ($0<k<1$) times the amplitude at the candidate frequency with a negative slope.

5. The method of claim 1, wherein the action of determining a range of influence of a zero involves determining the higher root frequency by finding the lowest frequency passing through a factor k ($k>1$) times the amplitude at the candidate frequency with a positive slope.

6. The method of claim 1, wherein the action of checking further involves fitting a straight line and an intercept to a phase determined for the region of influence.

7. The method of claim 1, wherein the action of checking further involves unwrapping operation of locating instantaneous phase changes.

8. The method of claim 1, wherein the action of smoothing involves using an averaging window wherein a width of the averaging window increases linearly with frequency.

9. The method of claim 1, wherein the sorted candidate frequency values are stored in an array.

10. A method for determining the damped natural frequencies associated with the poles of a dynamic system comprising the actions of:

producing a frequency response function for the dynamic system;

smoothing the frequency response function;

identifying a set of possible candidate frequency values by determining when a derivative of the frequency response function traverses through zero with negative slope;

sorting the set of possible candidate frequency values based on amplitude;

identify the next candidate in the sorted candidate frequency values starting from the beginning of the set that has not been eliminated;

determining a range of influence by identifying a lower root frequency and higher root frequency;

eliminating the candidate frequency value by comparing the candidate frequency value with a maximum amplitude in the range of influence and when the candidate frequency value is eliminated returning to the action of identify the next candidate;

checking a direction of a change of phase in the range of influence is negative and when direction is positive eliminating the candidate frequency value and the returning to the action of identify the next candidate;

determining if the frequency candidate values is of lesser significance are in the range of influence by identifying frequency candidate values occurring later in the frequency candidate values and when the frequency candidate value occurs later and is a frequency within the range of influence of a presently considered candidate, eliminating the later candidate frequency value and the returning to the action of verifying a current candidate;

determining if the frequency candidate values is of greater significance are in the range of influence by identifying frequency candidate values occurring earlier in the frequency candidate values and when the frequency candidate value appear earlier eliminating the current candidate frequency value and the returning to the action of identify the next candidate;

eliminating the frequency candidate value by comparing a noise level in the frequency response function to the amplitude in the region of a zero and when the candidate frequency value is eliminated returning to the action of identify the next candidate; and returning to the action of identifying the next candidate until all frequency candidate values have been identified.

11. The method of claim 10, wherein the action of determining a range of influence involves determining the lower root frequency by finding the highest frequency passing through a factor k times the amplitude at the candidate frequency with a negative slope.

12. The method of claim 10, wherein the action of determining a range of influence involves determining the higher root frequency by finding the lowest frequency passing through a factor k times the amplitude at the candidate frequency with a positive slope.

13. The method of claim 10, wherein the action of checking further involves fitting a straight line and an intercept to a phase determined for the region of influence.

14. The method of claim 10, wherein the action of checking further involves unwrapping operation of locating instantaneous phase changes.

15. A system for determining the damped natural frequencies of a dynamic system comprising:

a module for producing a frequency response function for the dynamic system;

a module for smoothing the frequency response function;

a module for identifying a set of possible candidate frequency values by determining when a derivative of the frequency response function traverses through a value of zero;

a module for sorting the set of possible candidate frequency values based on amplitude;

a module for identifying the next candidate in the sorted candidate frequency values starting from the beginning of the set that has not been eliminated;

a module for determining a range of influence by identifying a lower root frequency and higher root frequency;

a module for eliminating the candidate frequency value by comparing the candidate frequency value with a maximum or minimum amplitude in the range of influence when the candidate frequency value is eliminated returning to the module for identify the next candidate;

a module for checking a direction of a change of phase in the range of influence occurs in an expected direction, and when direction is opposite the expected direction, eliminating the candidate frequency value and the returning to the action of identify the next candidate;

a module for determining if any frequency candidate values of lesser significance are in the range of influence by identifying frequency candidate values occurring later in the frequency candidate values set and when the frequency candidate value occurs later and is a frequency within the range of influence of the currently considered candidate, eliminating said later candidate frequency value and the returning to the action of verifying the current candidate;

a module for determining if any frequency candidate values of greater significance are in the range of influence by identifying frequency candidate values occurring earlier in the set frequency candidate values and when the earlier frequency candidate value has not been eliminated and appears in the range of influence of the currently considered candidate, eliminate the currently considered candidate frequency and the returning to the action of verifying the next candidate;

a module for determining if the frequency is in the range of influence of the frequency response function prior to the module for smoothing;

a module for eliminating the frequency candidate value by comparing a noise level in the frequency response function to the amplitude in the region of a pole and when the candidate frequency value is eliminated returning to the action of identify the next candidate; and a module for returning to the action of identifying the next candidate until all frequency candidate values have been identified.

16. The system of claim 15, wherein the module for determining a range of influence of a pole involves determining the lower root frequency by finding the highest frequency below the candidate frequency passing through a factor k (k<1) times the amplitude at the candidate frequency with a positive slope, and determining the range of influence of a zero involves determining a lower root frequency by finding a highest frequency below the candidate frequency passing through a factor k (k>1) times the amplitude at the candidate frequency with a negative slope.

17. The system of claim 15, wherein the module for determining a range of influence of a pole involves determining the higher root frequency by finding the lowest frequency greater than the candidate passing through a factor k (k<1) times the amplitude at the candidate frequency with a negative slope, and determining the range of influence of a zero involves determining a lower root frequency by finding a lowest frequency greater than the candidate passing through a factor k (k<1) times the amplitude at the candidate frequency with a positive slope.

18. The system of claim 15, wherein the module for checking further involves fitting a straight line and an intercept to a phase determined for the region of influence.

19. The system of claim 15, wherein the module for checking further involves unwrapping operation of locating instantaneous phase changes.

20. The system of claim 15, wherein the module for smoothing involves using an averaging window wherein a width of the averaging window increases linearly with frequency.

* * * * *